Dec. 15, 1925

P. J. DONAVAN

BRAKE TESTING MACHINE

Filed Feb. 19, 1925

Inventor

Paul J. Donavan.

By A. J. O'Brien

Attorney

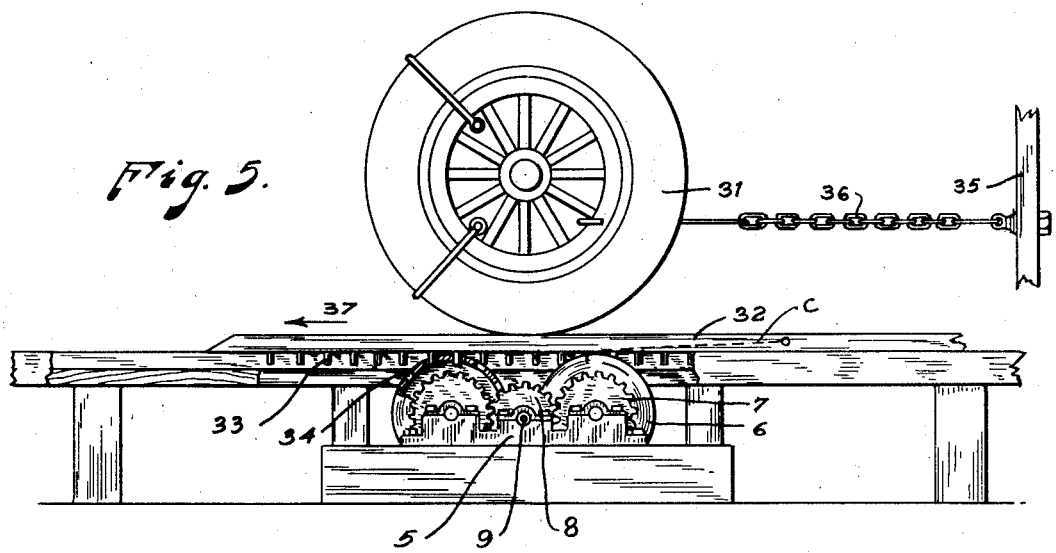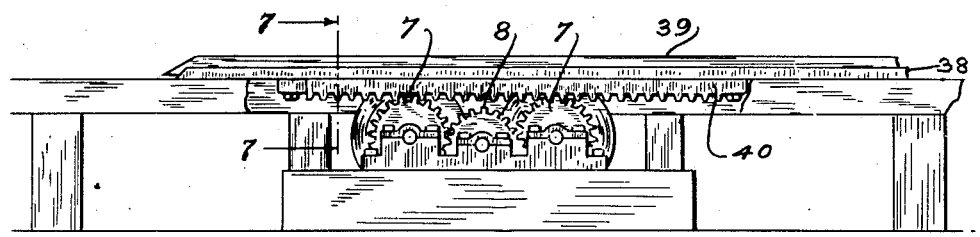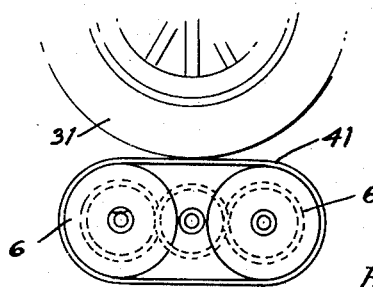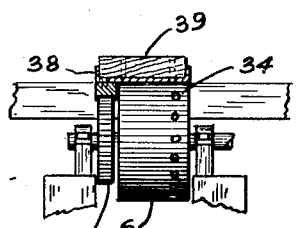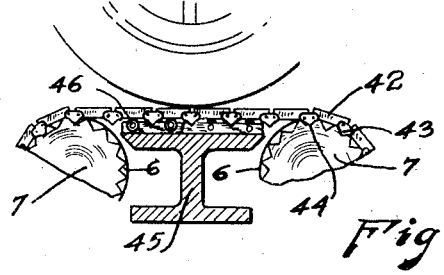

Patented Dec. 15, 1925.

1,565,717

UNITED STATES PATENT OFFICE.

PAUL J. DONAVAN, OF LOS ANGELES, CALIFORNIA.

BRAKE-TESTING MACHINE.

Application filed February 19, 1925. Serial No. 10,222.

*To all whom it may concern:*

Be it known that I, PAUL J. DONAVAN, a citizen of the United States of America, residing at Los Angeles, in the county of Los Angeles and State of California, have invented certain new and useful Improvements in Brake-Testing Machines; and I do declare the following to be a full, clear, and exact description of the invention, such as will enable others skilled in the art to which it appertains to make and use the same, reference being had to the accompanying drawings, and to the characters of reference marked thereon, which form a part of this specification.

This invention relates to improvements in brake testing machines of the type disclosed and claimed in Patent No. 1,517,106 granted to me on the 25th day of November, 1924.

The value of brakes depends almost entirely upon the care with which they are adjusted as it is obvious that brakes to be effective must be so adjusted that they will perform their function in an efficient manner. It has hitherto been very difficult to obtain any reliable data on the action of the brakes with the result that they were left severely alone until some emergency arose that showed the driver that his brakes were defective. It is now possible by means of the improved testing machine described in the above referred to patent, to determine quite accurately the effectiveness of the brakes of any car and to adjust the brakes on each wheel so as to render them equally effective.

It is the object of this invention to modify the construction described and claimed in the above referred to patent to such an extent that the desired tests may be quickly and conveniently made and which shall also be provided with means for determining the force necessary to slide the tires on the supporting surface. This is quite desirable for the reason that when this is known the brakes may be adjusted so that they will afford the greatest possible retarding effect.

The above and other objects that will become apparent as the description proceeds are attained by means which I will now proceed to describe in detail, reference for this purpose being had to the accompanying drawings in which:

Fig. 5 is a view, partly in section, showing the manner in which the tractive force between the wheel and its supporting surface can be measured.

Fig. 6 is a view similar to Fig. 5 and shows a modified form of apparatus.

Fig. 7 is a section taken on line 7—7, Fig. 6.

Fig. 8 is a diagrammatic side elevation showing how the rollers may be provided with a supporting belt, and Fig. 9 is a view similar to that in Fig. 8, but showing a modified form of belt.

Figure 1:
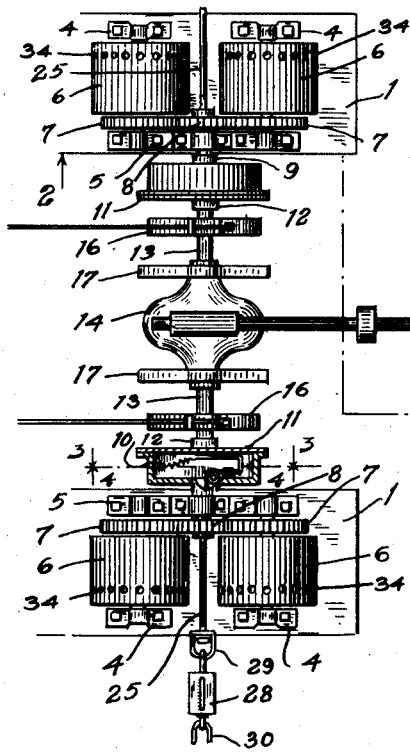
Fig. 1 is a plan view of my improved testing machine, parts thereof being broken away to better disclose the construction.
Figures 3, 4:
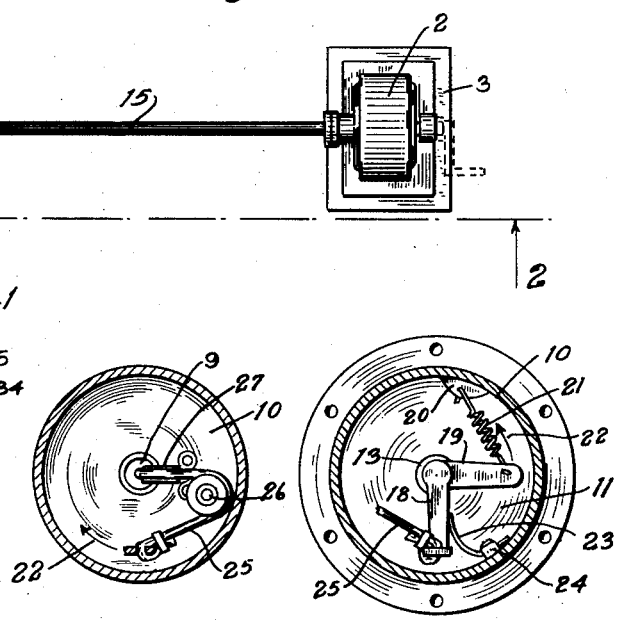
Fig. 3 is a section of one of the shaft couplings taken on line 3—3 Fig. 1.
Fig. 4 is a section taken on line 4—4, Fig. 1.

My device is constructed in the manner shown in Fig. 1 and may have parts thereof bolted to the supporting foundations 1, the motor 2 from which the power is derived being secured to the foundation block 3. Secured to the foundations 1 are pillow blocks 4 and 5. Rotatably mounted in proper bearings in blocks 4 and 5 so as to turn about parallel axes are rollers 6, each of which has rigidly secured to one end a gear wheel 7 that meshes with the pinions 8 which are nonrotatably connected to the hollow shafts 9. Secured to the other end of each of the shafts 9 is a cylindrical casing 10 that is provided with a removable cover 11. Journaled in the hub 12 of the cover 11 is a shaft 13. These shafts correspond to the rear axle shafts of an automobile and extend in opposite directions from a differential housing 14 that contains the usual differential gears. As the differential that I use is of the construction ordinarily employed with automobiles, I shall make no attempt to describe the same further than to say that power is transmitted to it from the motor 2 by means of the shaft 15 and that the shafts 13 may rotate at equal speeds or either one of them may be locked against rotation by means of the band brake 16 which, like the differential, is of ordinary and well known construction. The differential housing 14 i supported by the brackets 17. Since the shafts 13 are rotatable in the hubs 12, it is evident that the shafts 9 and pinions 8 will not be rotated unless some means is provided for transmitting power from shafts 13 to shafts 9. This means will now be described and for this purpose reference will be had more particularly to Figs. 3 and 4. If we bear in mind that the shaft 13 is rotatable in the hub 12, while the circular casing 10 and cover 11 are nonrotatably secured to the shafts 9, the manner in which the power is transmitted will be readily understood. From Fig. 4 it will be noted that a bell crank lever having arms 18 and 19 is secured to the end of the shaft 13. The casing has a lug 20 that serves as an anchor for one end of the tension spring 21, the other end of which is secured to the outer end of the arm 19. The shaft 13 tends to rotate the arms 18 and 19 in the direction of the arrow 22. A spring 23 may, if desired, be secured to the inner wall of casing 10 by means of a clamp 24. This spring offers a resistance to rotation of arm 18 but is not an essential element in this combination, its function being merely to reduce the tension in the rope 25. The rope 25 is fastened to the outer end of arm 18 and passes around a pulley 26 that is rotatably connected to the casing 10; this rope also passes over the pulley 27 and through the hollow shaft 9 and has its outer end connected to the spring scale 28 by means of a swivel 29. The scale is anchored to a stationary member by some means such as that indicated by numeral 30. It is now evident that if we apply a force tending to rotate the shaft 13 in the direction of the arrow 22 that this force will transmit a torque to the casing 10 through the action of the cable 25. The force will produce a tension in the cable and the value of this tension will be measured by the scale 28. If some means is applied to the rollers 6 to cause friction or to interfere with their free rotation a greater amount of torque will be necessary to rotate them and this requires a greater tension in the cables which increases the reading of the scale. By means of the band brakes 16 it is possible to stop the rotation of either one of the shafts 13 which feature is taken advantage of in obtaining a comparative reading for the two wheels in a manner to be hereinafter described.

Figure 2:
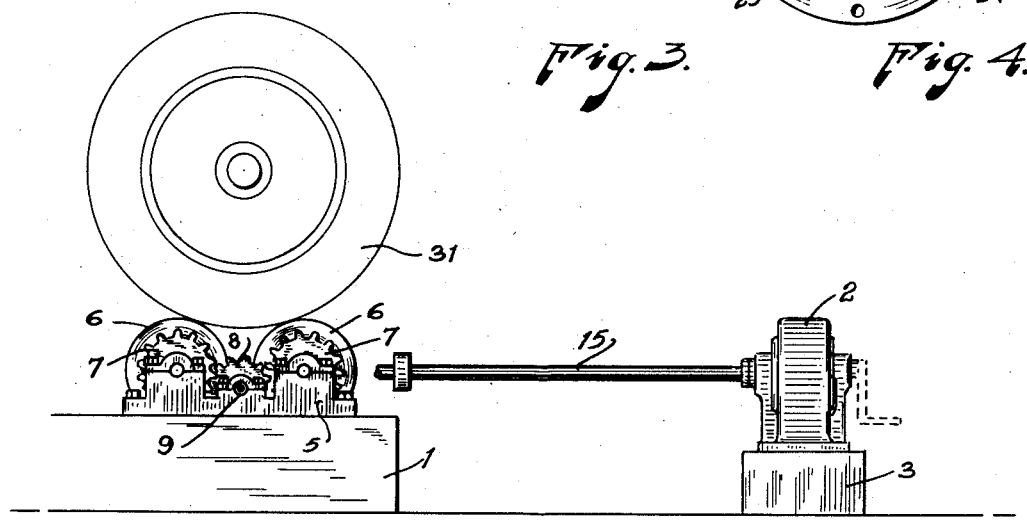
Fig. 2 is a side elevation of the parts shown in Fig. 1, this view being taken along line 2—2.

Let us now describe the operation of the device shown in Figs. 1 to 4. Let us suppose that the wheel 31 in Fig. 2 represents one of the rear wheels of an automobile and that power is applied tending to rotate the rollers 6 in a clockwise direction. The force in the cables 25 can be determined by reading the scale 28. If the brakes are now applied to the wheels the tension in the cables 25 will increase, a point will soon be reached where the maximum effect of the brake is exerted and the reading of the scale for this point noted. If the brakes on the two wheels are not adjusted alike, one wheel may stop rotating before the other one. To obtain the same adjustment for both wheels, one or the other of the band brakes 17 may be operated to lock the shaft 13, after which the reading corresponding to the effectiveness of the brake for the rotating wheel may be determined. By this means the brakes may readily be adjusted so as to be equally effective.

It is evident that the friction between the wheel and the ground is the thing that limits the action of the brake and it is not necessary nor desirable to have brakes that will lock the wheels against rotation. The ideal condition is where the brakes will exert the greatest possible force without causing the wheel to stop turning.

It is my intention to first measure the force that is required to slide the wheels on the supporting surface and then to adjust the brakes so that they will resist a force almost equal to this. I accomplish this adjustment in the following manner:

Referring more particularly to Fig. 5, it will be noted that I have provided a plank 32 with a row of pins 33 that project downwardly and engage with the holes 34 in the rollers 6, thereby producing a rack and pinion effect. The wheel 31 rests upon the plank 32 and is anchored to a stationary member 35 by means of a chain 36. The motor 2 is now operated and sufficient current applied thereto to produce the necessary force to move the plank 32 in the direction of the arrow 37. The value of this force is determined by reading the scale 28. The wheel is now adjusted as in Fig. 2 and the brakes adjusted until substantially the same reading is obtained. In Figs. 6 and 7, I have shown how a channel iron 38 with a board 39 attached may be substituted for the plank 32. Instead of the row of pins 33, a rack 40 may be attached. This rack engages with the gear wheels 7. Instead of the arrangement shown in Figs. 5, 6 and 7, I may apply an endless belt 41 to the rollers as indicated in Fig. 8. Better results will be obtained if the belt instead of being made from flexible material is made of a number of flat plates or boards 42 hinged at 43. The hinges may be provided with lugs 44 that engage the teeth on wheels 7. To support the weight of the automobile wheel without subjecting the belt 42 to too great a strain I provide a support which I have shown as an I beam 45. Rollers 46 are secured to the top of this beam. These rollers engage the lower surface of the belt 42 in the manner shown.

Instead of using a rack or its equivalent, a plurality of pins on the support as shown in full lines in Figs. 5 and 6, I may merely attach one end of a cable C (indicated by dotted lines in Fig. 1) to the pulley and the other to the support in the manner shown.

It is evident from the above description that I have produced a testing machine by means of which the effect of the brakes can be readily determined for each wheel and in which the slipping resistance between the tire surface and the support upon which it rests may be readily determined.

Having now described my invention what I claim as new is:

1. In a machine for testing automobile brakes, in combination, two spaced pairs of rollers, said rollers being rotatable about parallel axes, each pair being adapted to support one of the rear wheels of an automobile, a source of power, means for connecting the source of power to the rollers for the purpose of rotating the rollers in the same direction, said connecting means comprising, a differential mechanism having two axially aligned shafts adapted for independent rotation, means for connecting each of said shafts to a pair of rollers, a brake mechanism applied to each of said shafts and a dynamometer between each brake mechanism and the corresponding set of rollers whereby the power transmitted to each set of rollers may be measured.

2. In a machine for testing automobile brakes, in combination, two spaced pairs of rollers, said rollers being rotatable about parallel axes, each pair being adapted to support one of the rear wheels of an automobile, a source of power, means for connecting the source of power to the rollers for the purpose of rotating the rollers in the same direction, said connecting means comprising a differential mechanism having two axially aligned shafts adapted for independent rotation, means for connecting each of said shafts to a pair of rollers, a brake mechanism applied to each of said shafts, a dynamometer between each brake mechanism and the corresponding set of rollers whereby the power transmitted to each set of rollers may be measured and means associated with each pair of rollers for supporting an automobile wheel.

3. In a machine for testing automobile brakes, in combination, two spaced pairs of rollers, said rollers being rotatable about parallel axes, each pair being adapted to support one of the rear wheels of an automobile, a source of power, means for connecting the source of power to the roller for the purpose of rotating the rollers in the same direction, said connecting means comprising a differential mechanism having two axially aligned shafts adapted for independent rotation, means for connecting each of said shafts to a pair of rollers, a brake mechanism applied to each of said shafts, a dynamometer between each brake mechanism and the corresponding set of rollers whereby the power transmitted to each set of rollers may be measured and means associated with each pair of rollers for supporting an automobile wheel, said means being connected to the rollers by means that prevent the supporting means from sliding on the rollers.

4. In a machine for testing automobile brakes, in combination, two spaced pairs of rollers, said rollers being rotatable about parallel axes, each pair being adapted to support one of the rear wheels of an automobile, a source of power, means for connecting the source of power to the rollers for the purpose of rotating the rollers in the same direction, said connecting means comprising a differential mechanism having two axially aligned shafts adapted for independent rotation, means for connecting each of said shafts to a pair of rollers, means comprising a brake mechanism for stopping the rotation of either set of rollers and a dynamometer between the differential and each set of rollers for measuring the torque exerted by the driving apparatus in its attempt to rotate the rollers.

5. In a machine for testing automobile brakes, in combination, two spaced pairs of rollers, said rollers being rotatable about parallel axes, each pair being adapted to support one of the rear wheels of an automobile, a source of power, means for connecting the source of power to the rollers for the purpose of rotating the rollers in the same direction, said connecting means comprising a differential mechanism having two axially aligned shafts adapted for independent rotation, means for connecting each of said shafts to a pair of rollers, means comprising a brake mechanism for stopping the rotation of either set of rollers a dynamometer between the differential and each set of rollers for measuring the torque exerted by the driving apparatus in its attempt to rotate the rollers, said dynamometer comprising a casing interposed between the ends of a two part shaft, said casing being nonrotatably connected to one of said shafts and rotatably connected to the other shaft, a crank arm located within the casing, said arm being nonrotatably connected to the end of the shaft that is rotatably connected to the casing and a cable connecting the end of said arm to the casing.

6. In a machine for testing automobile brakes, in combination, two spaced pairs of rollers, said rollers being rotatable about parallel axes, each pair being adapted to support one of the rear wheels of an automobile, a source of power, means for connecting the source of power to the rollers for the purpose of rotating the rollers in the same direction, said connecting means comprising a differential mechanism having two axially aligned shafts adapted for independent rotation, means for connecting each of said shafts to a pair of rollers, means comprising a brake mechanism for stopping the rotation of either set of rollers, a dynamometer between the differential and each set of rollers for measuring the torque exerted by the driving apparatus in its attempt to rotate the rollers, said dynamometer comprising a casing interposed between the ends of a two part shaft, said casing being nonrotatably connected to one of said shafts and rotatably connected to the other shaft, a crank arm located within the casing, said arm being nonrotatably connected to the end of the shaft that is rotatably connected to the casing, a cable connecting the end of said arm to the casing, and means for measuring the tension in said cable.

7. In a machine for testing automobile brakes, in combination, two spaced pairs of rollers, said rollers being rotatable about parallel axes, each pair being adapted to support one of the rear wheels of an automobile, a source of power, means for connecting the source of power to the rollers for the purpose of rotating the rollers in the same direction, said connecting means comprising a differential mechanism having two axially aligned shafts adapted for independent rotation, means for connecting each of said shafts to a pair of rollers, means comprising a brake mechanism for stopping the rotation of either set of rollers, a dynamometer between the differential and each set of rollers for measuring the torque exerted by the driving apparatus in its attempt to rotate the rollers, said dynamometer comprising a casing interposed between the ends of a two part shaft, said casing being nonrotatably connected to one of said shafts and rotatably connected to the other shaft, a crank arm located within the casing, said arm being nonrotatably connected to the end of the shaft that is rotatably connected to the casing, a cable connecting the end of said arm to the casing, means for measuring the tension in said cable and spring means interposed between said arm and said casing for reducing the strain on the cable.

In testimony whereof I affix my signature.

PAUL J. DONAVAN.